United States Patent [19]
Watanabe

[11] 3,832,052
[45] Aug. 27, 1974

[54] ELECTROMAGNET DRIVING SWITCH ARRANGEMENT FOR ELECTRONIC CAMERA SHUTTERS

[75] Inventor: Koichiro Watanabe, Funabashi, Japan

[73] Assignee: Asahi Kogaku Kogyo Kabushiki Kaisha, Tokyo-to, Japan

[22] Filed: May 8, 1973

[21] Appl. No.: 358,265

[30] Foreign Application Priority Data
May 15, 1972 Japan.............................. 47-55570

[52] U.S. Cl. ................................................ 354/51
[51] Int. Cl. ............................................. G03b 7/08
[58] Field of Search .......................... 95/10 C, 10 T

[56] References Cited
UNITED STATES PATENTS
3,707,114  12/1972  Ogihara ................................. 95/10

Primary Examiner—Samuel S. Matthews
Assistant Examiner—Michael L. Gellner
Attorney, Agent, or Firm—Steinberg & Blake

[57] ABSTRACT

A camera which has an electromagnet for initiating closing of a camera shutter when the electromagnet is deenergized. A switching circuit is electrically connected with the electromagnet for determining the instant when the latter becomes deenergized in accordance with an information signal received by the switching circuit. A control circuit is electrically connected with the switching circuit for placing the latter in a condition which prevents energizing of the electromagnet as long as a switch of the control circuit remains closed. It is only upon opening of this latter switch that it becomes possible for the electromagnet to become energized. This latter switch is opened after initiation of the shutter opening operation and just prior to the opening of the shutter, whereby the electromagnet will remain deenergized during light measurement and other preparatory operations and will only be energized just prior to the opening of the shutter.

7 Claims, 2 Drawing Figures

ELECTROMAGNET DRIVING SWITCH ARRANGEMENT FOR ELECTRONIC CAMERA SHUTTERS

BACKGROUND OF THE INVENTION

The present invention relates to cameras.

In particular, the present invention relates to automatic shutter controls for cameras.

It is known to provide cameras with electronic circuits capable of automatically determining the exposure time in accordance with information signals such as a signal in accordance with the brightness at the object to be photographed. Such electronic circuits conventionally control an electromagnet which responds to the electronic circuitry in order to bring about closing of a camera shutter, so as to terminate the exposure time.

As is well known, there is a certain time lag between the instant when a signal is transmitted to the electromagnet and the actual operation thereof. Thus, in response to an energizing signal the electromagnet will become energized after a certain time lag and in response to a deenergizing signal the electromagnet will become deenergized after a certain time lag. These time lags include the time required for an armature to respond to attraction resulting from energizing of the electromagnet and to release from the electromagnet when the latter is deenergized. As is well known, the time lag encountered when an electromagnet is energized in order to attract an armature is greater than the time lag encountered when the electromagnet is deenergized to release the armature. Thus, because of the smaller time lag involved in release of the armature, most shutter-controlling systems of the above type energize the the electromagnet in order to maintain the shutter in its open position and deenergize the electromagnet in order to release the shutter so that it can assume its closed position. In this way it becomes possible to achieve a highly precise determination of the exposure time. Thus, with such systems the supply of current to the electromagnet is started prior to opening of the shutter, so that the electromagnet will act on a release pawl or the like, for example, to maintain the shutter in its open position until the electromagnet is deenergized, releasing such a pawl, for example, so as to permit the shutter assume its closed position.

In order to bring about an operation of this latter type it is conventional to locate the electromagnet in a circuit which connects the electromagnet to a source of current during the initial stage of depression of a shutter-tripping plunger or button, so that when the operator of the camera depresses the shutter-tripping element the electromagnet will become energized to maintain the shutter in its open position after the shutter is tripped and until the electromagnet is deenergized. Thus, with a construction of this latter type as soon as the current is supplied to the electromagnet during the first part of the movement of the shutter-tripping element by the operator, the electromagnet will remain energized throughout such preparatory operations as measurement of light, swinging up of a mirror in the case of a single lens camera, and the like. Inasmuch as such electromagnets consume an intense or large amount of current, as compared with the current required for other circuits, this type of operation is not desirable because of the waste of power.

It has therefore already been proposed to minimize this latter drawback by situating in a series circuit in which the electromagnet is located in a switch for controlling the supply of current to the electromagnet, and this latter switch is not closed until after the preparatory operations such as light measurement and the like are carried out with the current source switch already closed. The additional switch connected in series with the electromagnet is only closed just prior to opening of the shutter, so that in this way there is a saving of power utilized for maintaining the electromagnet energized. However, the closing of this additional switch to energize the electromagnet obly at an instant just prior to actual opening of the shutter requires that the additional switch be built into the camera in driving connection with a mechanism of the camera which operates during opening of the shutter. Because of this latter requirement, this additional switch does not have a sufficient amount of mechanical rigidity and does not have a sufficient contact pressure to remain reliably closed from the instant just prior to opening of the shutter until the exposure time is to be terminated. In other words, the action of the shutter itself, when it moves from its closed to its open position, as well as the energizing of the electromagnet, create vibrations and chattering when this additional switch is closed, and because of the above factors according to which the switch cannot be made very rigid and cannot have a high contact pressure, the switch sometimes opens due to the vibration and chattering. This undesired opening of the switch, even though it takes place momentarily, prevents the electromagnet from maintaining the required retaining action on the element which prevents the shutter from closing, with the result that the shutter closes prematurely so that a proper exposure time is not achieved and the action of the camera becomes unstable.

SUMMARY OF THE INVENTION

It is accordingly a primary object of the present invention to provide a construction which will avoid the above drawbacks.

In particular, it is an object of the present invention to provide a circuit which will indeed prevent energizing of the electromagnet until an instant just prior to opening in the shutter while at the same time reliably maintaining the electromagnet energized until it is deenergized to terminate the exposure after a proper exposure time has elapsed.

In particular, it is an object of the present invention to provide a circuit of this type as part of electronic shutter controls capable of automatically determining the exposure time in accordance with a series of factors which include, for example, the brightness at the object to be photographed.

It is furthermore an object of the present invention to provide a circuit of this latter type which will prevent any instability in the camera operation, assuring that the required exposure times will be achieved, while at the same time operating a switch for controlling energizing of the electromagnet from a camera mechanism which automatically assumes a given position upon opening of the camera shutter.

In accordance with the invention the camera includes an electromagnet means which when energized will maintain a camera shutter in its open position and which upon becoming deenergized releases the shutter so that it can run down to its closed position. A switching circuit means electrically connected with the electromagnet means to determine the instant when the latter becomes deenergized, and an information circuit means is electrically connected with the switching circuit means for operating the latter in accordance with information such as brightness at the object to be photographed, so that a signal from the information circuit means will act through the switching circuit means on the electromagnet means to deenergize the latter after a proper exposure time has elapsed. A control circuit means is electrically connected with the switching circuit means to control the operation thereof, and this control circuit means includes a switch means movable between open and closed positions, this switch means when in its closed position rendering the control circuit means operative to prevent the switching circuit means from assuming a condition according to which it is possible to energize the electromagnet, while when the switch means is in its open position it places the control circuit means in an inoperative condition preventing the switching circuit means from assuming a condition which will prevent energizing of the electromagnet. Of course, with this arrangement as long as the switch means remains closed it is not possible for the electromagnet to become energized and thus all of the preparatory operations referred to above can be carried out while the switch means is closed. The switch means is opened automatically in connection with operation of an element of the camera which moves to a given position upon opening of the shutter, and it is only upon opening of the switch means that it becomes possible for the electromagnet to be energized just prior to opening of the shutter. Thus, with such an arrangement all of the advantages resulting from the additional series switch in the circuit of the electromagnet to prevent undesirable power consumption are maintained while at the same time the unstable action of the electromagnet is prevented.

BRIEF DESCRIPTION OF DRAWINGS

The invention is illustrated by way of example in the accompanying drawings which form part of this application, and in which.

DESCRIPTION OF PREFERRED EMBODIMENTS

Figure 1:
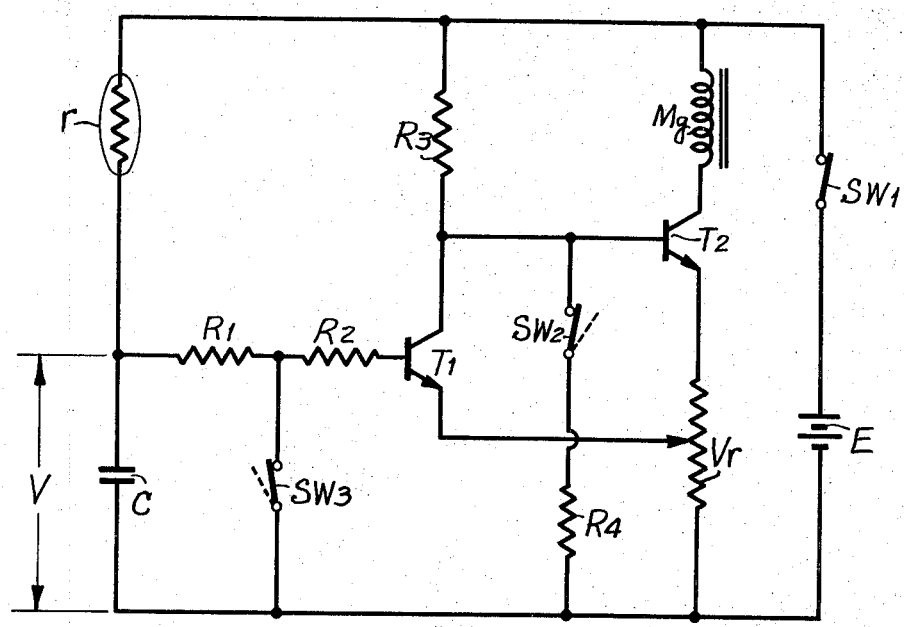
FIG. 1 is a wiring diagram illustrating electrical circuitry in accordance with the invention.

The drawings illustrate the invention as applied, by way of example, to a camera which has a focal plane shutter. The time during which the shutter is maintained open, so as to determine the exposure time, is controlled in a well known manner by a timing circuit which forms an information circuit means for transmitting an information signal to a switching circuit means, as described below. This information circuit means includes the timing circuit formed by the photosensitive element $r$ in the form of a suitable photoconductor which receives light from the object to be photographed and which is connected in series with a capacitor C. The information circuit means which includes the latter elements is electrically connected with the switching circuit means which includes the transistors $T_1$ and $T_2$. During operation a voltage V will build up across the capacitor C, and the switching circuit means which includes the transistors $T_1$ and $T_2$ responds to this voltage of the capacitor C. FIG. 1 further illustrates the electromagnet means Mg connected in series with the circuit which is controlled by the switching circuit means. The circuitry also includes a current source circuit containing the current source battery E and the current source switch $SW_1$, the circuitry further including the necessary resistors $R_1$, $R_2$, and $R_3$, as well as a variable resistor $V_r$. The information circuit means includes a timing switch $SW_3$ which is connected across the capacitor C in parallel therewith, through the resistor $R_1$, for short-circuiting discharge of the capacitor in a well known manner. This switch $SW_3$ is arranged in such a way, well known in the art, as to be opened in synchronism with opening of the shutter. Thus, in the case of a focal plane shutter, when the leading curtain moves away from the trailing curtain to open the shutter, the switch $SW_3$ automatically opens. The above-described circuitry which is shown in FIG. 1 is an example of a fundamental electronic shutter circuit well known in the art. The corresponding fundamental principle according to which this circuit operates can be applied to many other examples. In the example illustrated, in accordance with the present invention, a control circuit means is electrically connected with the switching circuit means in order to place the latter in a condition which will prevent energizing of the electromagnet Mg until an instant prior to opening of the shutter. This control circuit means is in the form of a bias circuit electrically connected to the base of transistor $T_2$ for connecting the base of this transistor in series with the negative pole of the battery E. Thus it will be seen that the control circuit means provides a circuit where the resistor $R_4$ and the switch means $SW_2$ of the control circuit means are connected in series between the negative pole of the battery E and the base of the transistor $T_2$. In other types of control circuits for the shutter the bias circuit will achieve also a control of the supply of the current to the electromagnet Mg, as described below.

With the circuit illustrated in FIG. 1, the bias or control circuit means maintains the transistor $T_2$ in its nonconductive state as long as the switch means $SW_2$ of the control circuit means is in its closed position. When the switch means $SW_2$ is placed in its open position, the control circuit means is rendered inoperative and the bias action thereof is eliminated so that the transistor $T_2$ then operates in a conventional manner as is well known with switching circuits in an arrangement as shown in FIG. 1 and described above. The switch means $SW_2$ is opened automatically just prior to opening of the shutter. For this switch means $SW_2$ is situated in the region of a switch-opening means which responds automatically to operation of a camera mechanism which moves when the shutter is opened.

Figure 2:
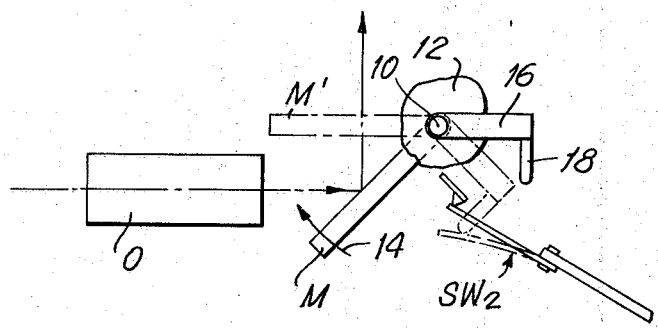
FIG. 2 is a schematic representation of mechanical structure for automatically operating a switch in accordance with the invention.

Thus, referring to FIG. 2, there is illustrated therein an example of a switch opening means which may be utilized with a single-lens reflex camera which includes, as schematically shown in FIG. 2, a tiltable mirror M situated behind the objective O. This mirror M normally assumes, prior to exposure, the inclined position shown in solid lines in FIG. 2, so that the light traveling through the objective will be reflected by the mirror M up to the viewfinder in a well known manner. The mirror M is mounted on a rotary shaft or rod 10 which extends through the opposed side walls 12 of a suitable box or other enclosure in which the mirror M is located behind the objective O. In response to operation of the shutter-tripping element by the operator, the mirror M will in a well known manner swing in the direction of the arrow 14 up to the dot-dash line position M', so that the light traveling through the objective can then continue to travel to the film in order to expose the latter. Outside of the wall 12 the shaft is extended to carry a lever 16 which turns with the shaft 10 as well as with the mirror M, and this lever 16 carries an operating pin 18 made of a suitable non-conductive material such as a suitable plastic. The switch $SW_2$ is situated in the path of swinging of the pin 18, as shown schematically in FIG. 2. Thus, the switch $SW_2$ may be in the form of a suitable leaf spring which normally assumes the closed position schematically shown in solid lines in FIG. 2. When the mirror M swings up to the position M', the pin 18 will swing to displace the switch $SW_2$ from the closed to the open position, as shown schematically in FIG. 2, and thus in this way it is possible to automatically open the switch $SW_2$ just prior to opening of the shutter. As is well known the shutter opens in synchronism with arrival of the mirror M at the exposure position M'.

Thus, when an exposure is to be made the operator will depress the shutter-tripping plunger, button, or the like, so as to mechanically release the leading curtain which moves ahead of the trailing curtain so as to open the shutter and start the exposure. The trailing curtain is urged by a spring toward its closed position so that such a spring tends to move the trailing curtain after the leading curtain in order to close the shutter, but a suitable pawl or the like is maintained by the electromagnet means Mg in a position which prevents release of the trailing curtain to the spring which urges it to the shutter-closing position. This maintenance of the trailing curtain against running down to its closed position results from supply of current to the electromagnet means Mg. Thus, when the electromagnet means Mg is energized the shutter cannot close. It is only when the supply of current to the electromagnet means Mg terminates that the trailing curtain is released to run down to its closed position and terminate the exposure.

With the circuitry shown in FIG. 1, all of the switches $SW_1$, $SW_2$ and $SW_3$ are closed during measurement of light at the object to be photographed and prior to supply of current to the electromagnet means Mg. Just prior to opening of the shutter, the switch means $SW_2$ is automatically opened, so that now the electromagnet means Mg will become energized. Thus, the trailing curtain will be prevented from moving to its closed position while the electromagnet means Mg remains energized. In synchronism with the opening of the shutter, the timing switch $SW_3$ is opened, so that at this time the voltage V at the capacitor C varies, and when this voltage V reaches a predetermined value, the transistor $T_1$ which initially is in a non-conductive or rest state transfers to a conductive or driving state, and at the same time the transistor $T_2$ will transfer from its conductive or driving state to its non-conductive or resting state, thus terminating the supply of current to the electromagnet means Mg, so that the trailing curtain is released and the shutter closes to terminate the exposure.

Of course, in a well known manner, upon closing of the shutter, the mirror M returns to its initial position as shown in FIG. 2, so that the switch $SW_2$ automatically closes, and the above operations are repeated for the next exposure.

It is apparent, therefore, that with the structure of the invention the switch $SW_2$ prevents energizing of the electromagnet Mg until just an instant prior to opening of the shutter. Therefore, during the preparatory operations referred to above the electromagnet is not energized and there is the saving of power which is referred to above. At the same time, the energizing of the electromagnet Mg can take place only upon opening of the switch $SW_2$, so that there is no problem in connection with maintaining such a switch closed even if it is a weak switch in the sense that it does not have a strong contact pressure. Since the switch $SW_2$ is in its open position in order to make it possible for the electromagnet means Mg to become energized, there is no possibility of unstable or faulty operation of any type as is the case with previously known arrangements where a switch in series with the electromagnet must be maintained closed for proper operation of the camera.

What is claimed is:

1. In a camera, electromagnet means for maintaining a camera shutter open while said electromagnet means remains energized and for initiating a shutter-closing operation when said electromagnet means becomes deenergized, switching circuit means electrically connected with said electromagnet means for deenergizing the latter at a given instant which will determine the exposure time, information circuit means electrically connected with said switching circuit means for transmitting to the latter a signal in accordance with information such as brightness at the object to be photographed for operating said switching circuit means to deenergize said electromagnet means at said instant which determines the exposure time, and control circuit means electrically connected with said switching circuit means for placing said switching circuit means in a condition which will render energizing of said electromagnet means possible, said control circuit means including a switch means operable just before the opening of the shutter and movable between open and closed positions, said switch means when in its closed position rendering said control circuit means operative to place said switching circuit means in a condition preventing energizing of said electromagnet means and when in its open position rendering said control circuit means inoperative to influence said switching circuit means so that upon opening of said switch means said electromagnet means is capable of being energized whereby said electromagnet means is deenergized until said switch means opens.

2. The combination of claim 1 and wherein a switch-opening means is situated adjacent said switch means for automatically opening the latter just prior to opening of the camera shutter.

3. The combination of claim 2 and wherein a camera mechanism moves automatically to a predetermined position upon opening of the camera shutter, and said switch-opening means being operatively connected with said camera mechanism to be actuated thereby for opening said switch means just prior to opening of the camera shutter.

4. In a camera, electromagnet means for maintaining a camera shutter open while said electromagnet means remains energized and for initiating a shutter-closing operation when said electromagnet means becomes deenergized, switching circuit means electrically connected with said electromagnet means for deenergizing the latter at a given instant which will determine the exposure time, information circuit means electrically connected with said switching circuit means for transmitting to the latter a signal in accordance with information such as brightness at the object to be photographed for operating said switching circuit means to deenergize said electromagnet means at said instant which determines the exposure time, and control circuit means electrically connected with said switching circuit means for placing said switching circuit means in a condition which will render energizing of said electromagnet means possible, said control circuit means including a switch means movable between open and closed positions, said switch means when in its closed position rendering said control circuit means operative to place said switching circuit means in a condition preventing energizing of said electromagnet means and when in its open position rendering said control circuit means inoperative to influence said switching circuit means so that upon opening of said switching means said electromagnet means is capable of being energized, a switch-opening means situated adjacent said switch means for automatically opening the latter just prior to opening of the camera shutter, a camera mechanism automatically movable to a predetermined position upon opening of the camera shutter, and said switch-opening means being operatively connected with said camera mechanism to be actuated thereby for opening said switch means just prior to opening of the camera shutter, the camera being a single-lens reflex camera, said camera mechanism including a swingable mirror which in a rest position extends across the optical axis of an objective of the camera and which swings up beyond the optical axis just prior to opening of the shutter, said switch-opening means being operatively connected with said mirror to be actuated thereby for opening said switching means when said mirror swings up beyond said optical axis.

5. In a camera, electromagnet means for maintaining a camera shutter open while said electromagnet means remains energized and for initiating a shutter-closing operation when said electromagnet means becomes deenergized, switching circuit means electrically connected with said electromagnet means for deenergizing the latter at a given instant which will determine the exposure time, information circuit means electrically connected with said switching circuit means for transmitting to the latter a signal in accordance with information such as brightness at the object to be photographed for operating said switching circuit means to deenergize said electromagnet means at said instant which determines the exposure time, and control circuit means electrically connected with said switching circuit means for placing said switching circuit means in a condition which will render energizing of said electromagnet means possible, said control circuit means including a switch means movable between open and closed positions, said switch means when in its closed position rendering said control circuit means operative to place said switching circuit means in a condition preventing energizing of said electromagnet means and when in its open position rendering said control circuit means inoperative to influence said switching circuit means so that upon opening of said switching means said electromagnet means is capable of being energized, said switching circuit means including a transistor electrically connected with said electromagnet means for enabling the latter to be energized only when said transistor is in a conductive state while said electromagnet means cannot be energized while said transistor is in a non-conductive state, said control circuit means being electrically connected with said transistor for maintaining the latter in its non-conductive state when said switch means is in its closed position.

6. The combination of claim 5 and wherein said transistor has a base to which said control circuit means is electrically connected with said control circuit means forming a bias circuit for said transistor.

7. The combination of claim 6 and wherein a battery forming a current source for all of said circuit means as well as said electromagnet means has a negative pole, said control circuit means being in the form of a series circuit extending between said negative pole of said battery and said base of said transistor, said switch means forming the only switch in said control circuit means for opening and closing the latter when said switch means moves between its open and closed position.

* * * * *